No. 869,373. PATENTED OCT. 29, 1907.
F. LAFFERTY & W. SPENCE.
VALVE MECHANISM FOR AIR COMPRESSORS.
APPLICATION FILED APR. 6, 1907.
2 SHEETS—SHEET 1.
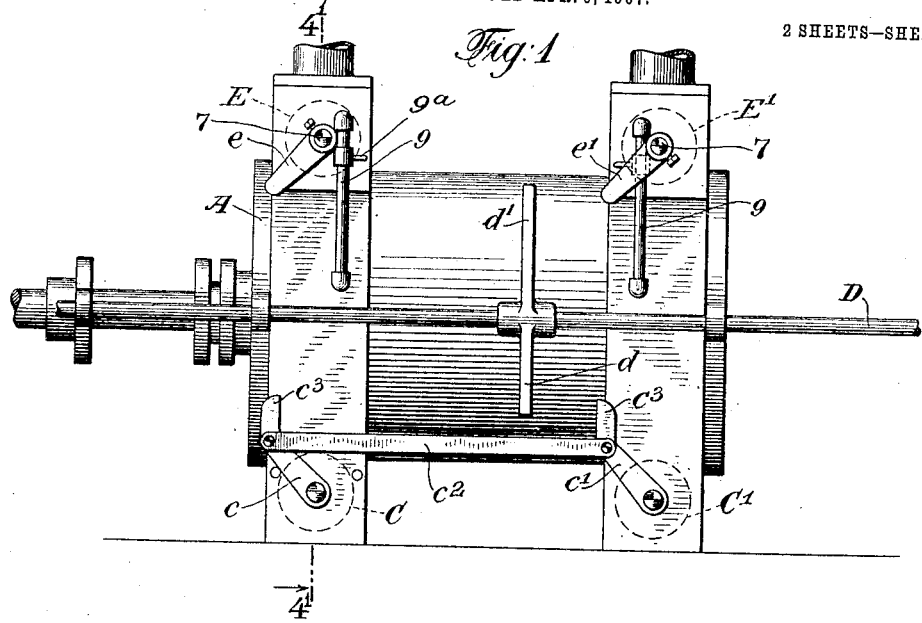
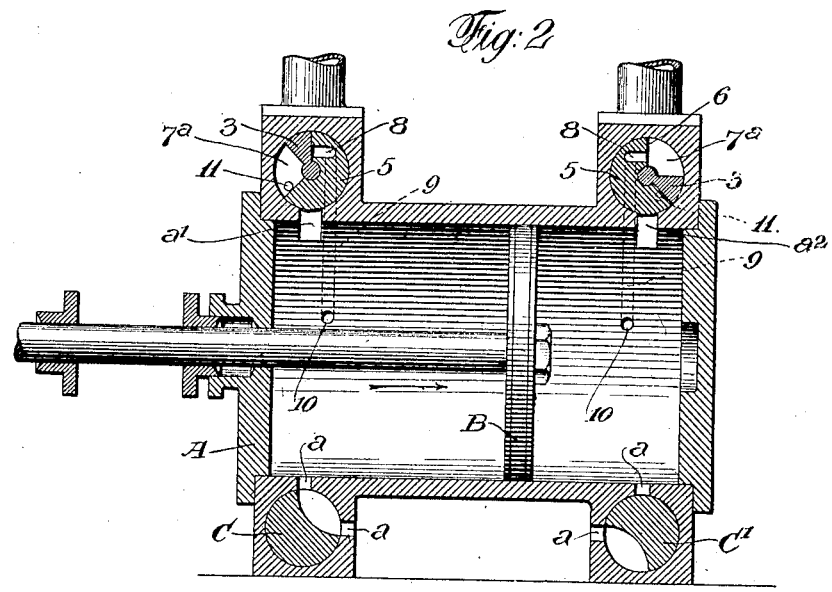
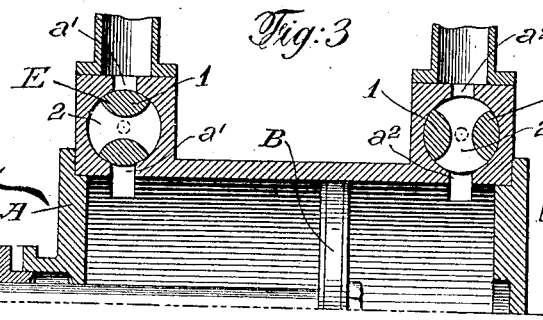
WITNESSES:
INVENTORS
Frank Lafferty
Watson Spence
BY John R. Nolan
ATTORNEY
THE NORRIS PETERS CO., WASHINGTON, D. C.

No. 869,373.
PATENTED OCT. 29, 1907.
F. LAFFERTY & W. SPENCE.
VALVE MECHANISM FOR AIR COMPRESSORS.
APPLICATION FILED APR. 6, 1907.
2 SHEETS—SHEET 2.
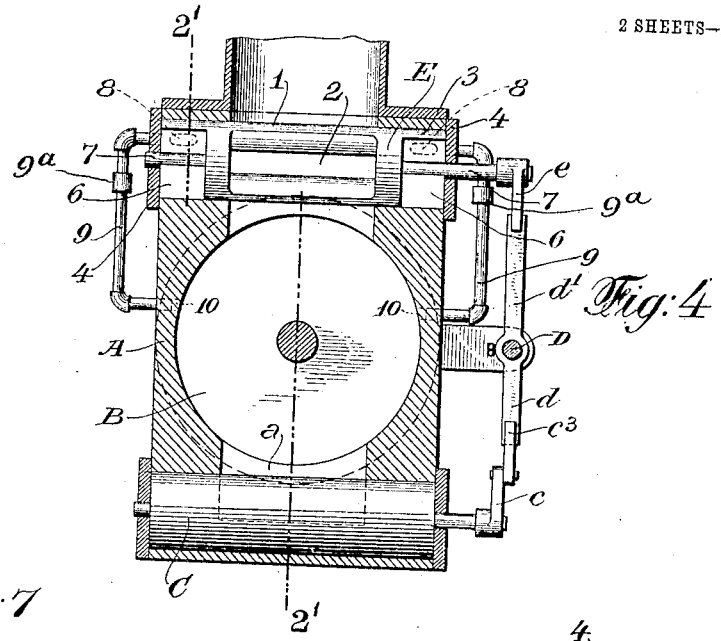
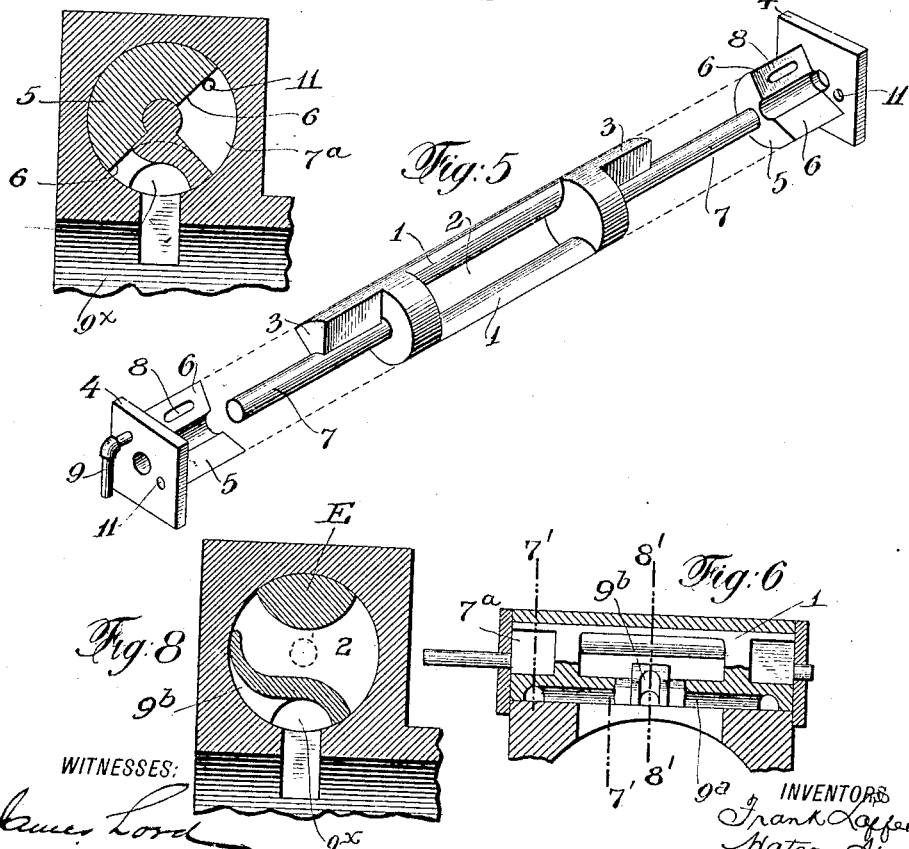
WITNESSES:
INVENTORS
Frank Lafferty
Watson Spence
BY
John F. Nolan
ATTORNEY

UNITED STATES PATENT OFFICE.

FRANK LAFFERTY, OF ELYRIA, OHIO, AND WATSON SPENCE, OF PHILADELPHIA, PENNSYLVANIA.

VALVE MECHANISM FOR AIR-COMPRESSORS.

No. 869,373.   Specification of Letters Patent.   Patented Oct. 29, 1907.

Application filed April 6, 1907. Serial No. 366,691.

*To all whom it may concern:*

Be it known that we, FRANK LAFFERTY, a resident of Elyria, in the county of Lorain and State of Ohio, and WATSON SPENCE, a resident of the city and county of Philadelphia and State of Pennsylvania, both citizens of the United States, have invented certain new and useful Improvements in Valve Mechanism for Air-Compressors, of which the following is a specification.

This invention relates to that class of air compressors or blowing engines in which rotary valves are employed for the discharge of the air from the respective ends of the compression cylinder; our object being to provide a simple and efficient construction whereby the opening of the discharge valves in alternation shall be controlled entirely by the air pressure within the cylinder without the aid of extraneous mechanical devices, as will be hereinafter fully described and claimed.

A preferred form of embodiment of our invention is illustrated in the annexed drawings, wherein—
Figure 1 is a side elevation of a portion of an air compressor or blowing engine equipped with our improved discharge valve. Fig. 2 is a vertical section thereof on a plane through the ends of the valve just beyond the discharge ports, as on the line 2′—2′ of Fig. 4. Fig. 3 is a similar section of the upper portion of the cylinder on a plane intersecting the discharge ports of the valves. Fig. 4 is a vertical section, as on the line 4′—4′ of Fig. 1. Fig. 5 is a perspective view of one of the discharge valves and its end heads. Fig. 6 is a vertical section through one of the discharge valves and its casing, the air duct or passage which connects the valve chamber with the compression cylinder being formed in the body of the valve. Figs. 7 and 8 are transverse sections, enlarged, as on the lines 7′—7′ and 8′—8′, respectively, of Fig. 6.

A represents the cylinder and B the reciprocating compression piston therein.

C, C′ are the rotary air inlet valves at the respective ends of the cylinder, which valves are oscillated in alternation during the reciprocation of the piston in a manner to open and close the respective inlet ports $a$, $a$, and thus permit the periodical ingress of air to the respective ends of the cylinder. These valves are opened and closed by suitable mechanical connections. In the present instance they are provided with crank arms $c$, $c′$, respectively, coupled by a link $c^2$, having at proper points projections $c^3$ that extend into the path of the depending portion $d$ of a tappet arm on a horizontal rod D. This rod is connected with the piston rod and is positively reciprocated thereby; and hence the arm $d$ in its traverse alternately engages the opposing projections of the link and effects thereby the periodical oscillation of the valves. Any suitable inlet valves may be employed with any appropriate actuating mechanism therefor.

E, E′ are the discharge valves at the respective ends of the cylinder, which valves are identical in construction and operation with each other, save that they are oppositely disposed, as seen in Figs. 2 and 3. These valves are of the rotary type and they are seated to oscillate in suitable casings on the cylinder so as to control the opening and closing of the respective discharge ports $a′$, $a^2$, of the cylinder.

Each of the valves E, E′, as preferably constructed, comprises a cylindrical body 1, provided with an elongated discharge port 2, extending transversely therethrough, which port, when brought into alinement with the adjacent ports $a′$, or $a^2$, permits the discharge of the compressed air from the cylinder. This body is provided at each of its ends with a sector-like wing 3, which is rotatably seated within a chambered head at the adjacent end of the valve casing. The head comprises a cap plate 4 with an inward projection 5 partially cylindrical in form, having radial inner faces 6. The head is centrally recessed and perforated to provide a seat and bearing for the valve stem 7; and its inner walls are oppositely beveled or inclined to afford within the adjacent end of the valve casing a segmental chamber $7^a$ within which the wing may be moved about the axis of the valve, a quarter-turn, or substantially so. In the form of our invention illustrated in Figs. 1 to 5 inclusive, there is provided in the upper wall of the chamber a recess or opening 8 which communicates with an external pipe 9 leading by way of a port 10 to the interior of the cylinder, whereby, at a predetermined time in the compression stroke of the piston, the air is caused to enter the pipe 9 in advance of the piston; pass by way of said pipe to the intercommunicating valve chamber, and therein impinge against and partially turn the opposing wing. The valve is thus correspondingly turned so as to open the port ($a′$, or $a^2$) for the discharge of the compressed air. In the cap plate is a vent hole 11 for the escape of air from the chamber $7^a$ during the downward movement of the wing therein.

The construction just described is formed at each end of the discharge valves, with corresponding pipe and port connections between the same and the interior of the cylinder. Each of the pipes is preferably provided with an air-regulating cock $9^a$.

The valves E, E′ are periodically closed by mechanical devices. In the present instance such valves are provided with depending crank arms $e$, $e′$, respectively, which extend into the path of the upwardly projecting portion $d′$ of the tappet arm on the rod D. Hence said portion $d′$ during its traverse, contacts with the crank arms alternately in a manner to effect the timely closing of the valves.

By referring to Fig. 2, it will be observed that the piston is indicated as traveling from left to right, and that the inlet valve C is open and the corresponding discharge valve is closed. It will also be observed that the inlet valve C' is closed and the corresponding discharge valve is open. Now, as the piston continues its stroke to the right, the valves will maintain the respective positions indicated, until the tappet $d'$ strikes the crank arm $e'$ of the discharge valve E', in which case said valve will be closed; and at the same time the tappet $d$ will strike the opposing projection $c^3$ of the link $c^2$, and effect the closing of the valve C and the opening of the valve C'. When the tappet strikes the arm $e'$, the piston has cleared the adjacent ports 10, so that during the closure of the valve E', the pressure within its segmental valve chambers will be free to exhaust to the atmospheric side of the piston. When, in the return stroke of the piston, sufficient compression of the air has been effected within the cylinder, the air is forced by way of the then forward pipes 9, into the chambers at the ends of the valve E, which air, acting against the opposing wings, effects a partial rotation of the said valve to open the same. Thus the valve is automatically opened by the air pressure and maintained in open position thereby until the piston has completed its compression stroke. This valve is then closed by mechanical devices, such as those previously described, and in the return compression stroke of the piston the other discharge valve is similarly opened by the air pressure within the cylinder.

In the form of our invention illustrated in Figs. 6 to 8, inclusive, we dispense with the pipes 9 and connect the valve chamber $7^a$ with the compression cylinder through a duct or passage $9^\times$ formed directly in and longitudinally of the body of the valve. The center of the duct is provided with a circumferential branch $9^b$ which, during the reciprocation of the piston permits the flow of the air to and from the valve chamber, first, to turn the valve automatically to discharging position, and secondly, to permit the air in the valve chamber to pass to the cylinder during the return of the valve to closing position.

We claim—

1. The combination of a cylinder having inlet and discharge ports, a reciprocating piston in said cylinder, valve mechanism for the inlet port, a valve for the discharge port comprising a rotary member having an air-actuated portion, a casing affording a chamber for such portion, a chambered head for said casing having a port for admitting pressure to one face of said air-actuated portion, and an air duct or passage connecting the port of said chambered head with the interior of the cylinder, whereby said valve is automatically turned and the discharge port opened by the pressure within the cylinder.

2. The combination of a cylinder having inlet and discharge ports, a reciprocating piston in said cylinder, valve mechanism for the inlet port, a valve for the discharge port comprising a rotary member having an air-actuated portion, a casing affording a chamber for such portion, a chambered head for said casing having a port for admitting pressure at one face of said air-actuated portion, and an air duct or passage connecting the port of said chambered heads with the interior of the cylinder, whereby said valve is automatically turned and the discharge port opened by the pressure within the cylinder, and devices for returning said valve to its closing position.

3. The combination of a cylinder having plural inlet and discharge ports, a reciprocating piston in said cylinder, valve mechanism for the inlet ports, rotary valves for the discharge ports having air-actuated portions, casings affording chambers for such portions, chambered heads for said casings having ports for admitting pressure at one face of said air-actuated portions, and air ducts or passages connecting the ports of said chambered heads with the interior of the cylinder, whereby the said rotary valves are automatically opened in alternation by the pressure within the cylinder.

4. The combination of a cylinder having plural inlet and discharge ports, a reciprocating piston in said cylinder, valve mechanism for the inlet ports, rotary valves for the discharge ports having air-actuated portions, casings affording chambers for such portions, chambered heads for said casings having ports for admitting pressure at one face of said air-actuated portions, air ducts or passages connecting the ports of said chambered heads with the interior of the cylinder, whereby said rotary valves are automatically opened in alternation by the pressure within the cylinder, and mechanical devices for returning said rotary valves to closed positions at intervals.

5. The combination of a cylinder having inlet and discharge ports, a reciprocating piston in said cylinder, valve mechanism for the inlet port, a valve for the discharge port comprising a rotary body having a port therethrough and having end-projecting wings, a casing for said valve having at its ends chambers for said wings, respectively, and ducts or passages leading from said chambers to the interior of the cylinder.

6. The combination of a cylinder having inlet and discharge ports, a reciprocating piston in said cylinder, valve mechanism for the inlet port, a valve for the discharge port comprising a rotary body having a port therethrough and having end-projecting wings, a casing for said valve having at its ends chambers for said wings, respectively, ducts or passages leading from said chambers to the interior of the cylinder, whereby said rotary valve is turned and the discharge port thereof opened by the pressure within the cylinder, and mechanical devices for periodically turning said rotary valve to its closing position.

7. The combination of a cylinder having inlet and discharge ports at its respective ends, a reciprocating piston in said cylinder, rotary valves for the inlet ports, operative connections between said valves, means for actuating the same, rotary valves for the discharge ports having air-actuated portions, casings affording chambers for such portions, ducts or passages connecting said chambers with the interior of the cylinder to permit the opening of the said rotary valves by the pressure within the cylinder, and mechanism whereby said latter valves are independently actuated to close the discharge ports of the cylinder.

FRANK LAFFERTY.
WATSON SPENCE.

Witnesses to signature of Frank Lafferty:
GEO. H. CHAMBERLAIN,
GUST KOLINSKI.

Witnesses to signature of Watson Spence:
FRANK DOMINICK,
WILLIAM SANDMANN.